Nov. 9, 1965           F. H. DROSTHOLM         3,216,622
METHOD OF CONTROLLING THE QUANTITIES DISCHARGED DURING
PREDETERMINED PERIODS OF ONE OR MORE VISCOUS LIQUIDS
AND APPARATUS FOR PERFORMING THE METHOD
Filed June 29, 1964
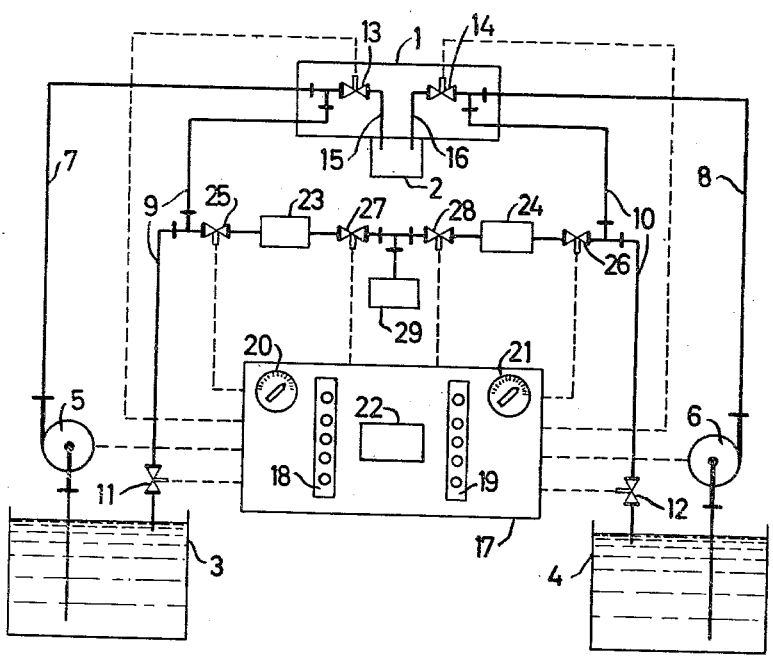
INVENTOR
Frede Hilmar Drostholm
BY *Stevens, Davis, Miller & Mosher*
ATTORNEYS United States Patent Office 3,216,622
Patented Nov. 9, 1965

3,216,622
METHOD OF CONTROLLING THE QUANTITIES DISCHARGED DURING PREDETERMINED PERIODS OF ONE OR MORE VISCOUS LIQUIDS AND APPARATUS FOR PERFORMING THE METHOD
Frede Hilmar Drostholm, 106 Maglemosevej, Vedbaek, Denmark
Filed June 29, 1964, Ser. No. 378,508
Claims priority, application Denmark, July 1, 1963, 3,126/63
3 Claims. (Cl. 222—135)

This invention is concerned with a method of controlling the quantities, discharged during predetermined periods, of one or more viscous liquids in an apparatus where each of such liquids are passed from a reservoir to a place of discharge by means of a pump.

Such methods are inter alia employed in the production of plastics from two or more liquid components which, when mixed, rapidly react with each other, for example solidify while foaming. The quantity of the liquids discharged must be accurate, and the mutual ratios in particular must be very accurate. Although the said quantities may be set by adjusting the numbers of revolution of the pumps, it is nevertheless necessary to take test measurements periodically, and since on account of the high viscosity of the liquids such test measurement cannot be performed by means of the conventional flow meters, the procedure has heretofore been used that for periods corresponding to the periods of discharge, the quantities of liquid supplied by the pumps were drained off somewhere in the system. Subsequently, the quantities supplied have been weighed or measured and then poured back into the reservoirs.

The present invention has for its object to eliminate this cumbersome and time-consuming procedure and is for attaining said purpose characteristic in that such re-arrangement is performed in the apparatus that each of a number of the liquids for a period of the same length as that during which the discharge takes place, is passed to a measuring glass instead of to the place of discharge and that, subsequent to a reading of the quantity collected in the measuring glass having been effected, compressed air is applied to the measuring glass so that the liquid is pressed back into the reservoir. These processes which may be carried out by far more quickly and by far more easily than the known weighing or measuring with a loose measuring glass, afford a considerable saving of time and an essential facility as compared with the prior art methods. Since the liquids used are very viscous, it is necessary to use compressed air for emptying the measuring glass.

This invention is also concerned with an apparatus for use in performing the method according to the invention, which apparatus comprises for each liquid to be discharged a reservoir and a pump for passing the liquid from the reservoir to the place of discharge. The characteristic of the apparatus according to the invention resides in that for each liquid it comprises valve means so arranged that subsequent to shifting of the valve means the liquid is passed from the pump into a measuring glass instead of to the place of discharge, the measuring glass being communicated with a compressed air source through other valve means and also with a return duct leading back to the reservoir. On shifting the first valve means admission for the liquid from the pump to the measuring glass is opened. If the pump is continuously operative, the shifting of the first valve means may be maintained for a period corresponding to the period of discharge. However, it is also possible first to shift the valve means and then operating the pump for a period corresponding to the period of discharge. When reading of the quantity of liquid passed to the measuring glass has been effected, the other valve means is opened whereupon the liquid is pressed back into the reservoir.

If the apparatus is of the type where the pump also works outside the period during which discharge is taking place, and consequently continuously sends a flow of liquid to the place of discharge from where the liquid outside the periods of discharge is by means of a first valve caused to return to the reservoir through the return duct, the measuring glass may according to the invention be in communication with the return duct through a second valve, and further provision may be made for a third valve in the return duct between the point of connection to the measuring glass and the reservoir. In this case only simple shut-off valves are required in the apparatus. Outside the periods of discharge the liquid circulates from the reservoir through the pump to the place of discharge and from there through the return duct and the open third valve back to the reservoir. During the period of discharge the third valve is closed whilst the first valve is opened. Hereby, liquid is discharged through the first valve. When a measurement is to be made, the third valve is closed whilst the second valve is opened whereby the liquid is pressed from the return duct into the measuring glass. When the measuring glass is to be emptied, the second valve and a fourth valve between the compressed air source and the measuring glass are opened. At the same time the pump is stopped to afford passage of the liquid from the measuring glass through the return duct.

In the case where the apparatus comprises a control panel having a number of control means said panel may according to the invention be so arranged that on operating a first control means the third valve is closed and the second valve is opened. For the filling of the measuring glass with the desired quantity of liquid, it is in this case only necessary to operate a single control means.

If the apparatus comprises an adjustable timing device for controlling the period of discharge, it may according to the invention expediently be so arranged that the blocking of the third valve and the opening of the second valve provided by means of said first control means are maintained for a period of the same length as the period of discharge set on the timing device. In this case it is definitely sure that the quantity of liquid passed into the measuring glass is exactly as great as the quantity discharged during the periods of discharge.

The invention will be particularly explained below with reference to the embodiment of an apparatus according to the invention diagrammatically shown in the accompanying drawing.

The apparatus shown is intended for discharging a mixture of two liquid components in a predetermined ratio. The liquid components may for example be materials which, when mixed, react with one another in such manner that a foam plastic is produced.

The discharge of the two liquids and the mixing of them are effected in a spray gun 1 comprising a mixing chamber 2.

Each of the two liquid components is contained in a reservoir 3 and 4 respectively from which the liquid, as soon as the apparatus has been started, is by means of a pump 5 and 6 respectively circulated in circuits comprising amongst other things flow ducts 7 and 8 respectively and return ducts 9 and 10 respectively. The flow ducts and the return ducts may in part consist of flexible hoses so that in relation to the other parts of the apparatus, the spray gun 1 constitutes a movable unit.

Each of the two return ducts 9 and 10 contains an electrically controlled valve 11 and 12 respectively, which is open in the normal state of the apparatus, i.e. the state of the apparatus when the two pumps 5 and 6 are working but no discharge of the two liquids is taking place. Consequently, in this state the two liquids circulate through the closed circuits just described.

The discharge of the two liquids takes place by two electrically controllable valves 13 and 14 in the spray gun being opened simultaneously with the two valves 11 and 12 in the return ducts being blocked. The liquids flowing from the pumps 5 and 6 are no longer capable of returning to the reservoirs 3 and 4 through the return ducts 9 and 10 and, consequently, they are pressed through the valves 13 and 14 and two pipes 15 and 16 respectively into the mixing chamber 2 and from there further on to a mould for producing the desired article.

The shifting of the valves is effected by means of a control panel 17 which for each liquid component comprises a number of operating buttons 18 and 19 respectively. Further, the panel comprises a control member 20 and 21 respectively, for each of the pumps 5 and 6, and a timing device 22 by means of which it is possible to set the period of discharge, i.e. the period during which the four valves 11, 12, 13 and 14 are shifted from the normal position.

As the two liquids are to be discharged in exact mutual ratios, it is necessary to have the possibility of measuring the quantities of liquids discharged. However, the liquids used are so viscous that it is not possible to use the conventional flow meters and, consequently, the apparatus comprises two measuring glasses 23 and 24 which each via an electrically controlled valve 25 and 26, respectively, are communicated with the two return ducts 9 and 10. When it be desired to take a measurement, the two valves 25 and 26 are opened simultaneously with the two valves 11 and 12 being closed. The liquids from the two pumps 5 and 6 now flow into the measuring glasses 23 and 24. If this state is maintained for a period of the same duration as the period of discharge, the quantities of liquids measured by means of the measuring glasses will correspond exactly to the quantities of liquid discharged during each period of discharge.

To this end, the valves 25 and 26 may during the measuring process be controlled by the same timing device 22 as used in connection with the discharge.

Since, as mentioned above, the liquids are highly viscous they cannot on their own flow back into the reservoirs 3 and 4 when the measuring process has been terminated, and each of the measuring glasses 23 and 24, are, therefore, through electrically controlled valves 27 and 28 communicated with a compressed-air source 29, which for example may be an air compressor or an air receiver.

During the emptying of the measuring glasses, the four valves 25, 26, 27, and 28 are opened and at the same time the two pumps 5 and 6 are stopped to afford passage of the liquids from the measuring glasses through the return ducts 9 and 10 and the valves 11 and 12 to the reservoirs 3 and 4.

In order to permit the liquids flowing into the measuring glasses 23 and 24 during the measuring process, provision must be made for the possibility that the air present in the measuring glasses can escape. The valves 27 and 28 may for example be arranged for affording this possibility.

The filling as well as the emptying of the measuring glasses is expediently effected by operating controls in the rows of control buttons 18 and 19.

Even if the above-described apparatus is arranged for discharging two liquid components, there should be nothing to prevent the apparatus from being arranged for discharging any other number of components.

In the apparatus described there is a row of operating buttons for each component. The apparatus may, however, also comprise a single set of operating controls for simultaneously controlling the flow of more liquid components.

Instead of the above-mentioned electrical control of the valves, other forms of control, for example hydraulic control, may be applied.

Instead of some of the single shut-off valves here used, it would be possible to use three-way valves whereby the number of valves may be reduced to some extent. Thus, if three-way valves are used instead of the valves 13, 14 and 25, 26, the valves 11, 12 may be dispensed with.

Finally, the apparatus may be so arranged that the pumps are only working during the discharge and during the introduction of liquid into the measuring glasses. In such case, return ducts are only required from the measuring glasses to the reservoir.

I claim:

1. An apparatus for the discharge of at least one viscous liquid in periods of predetermined duration, comprising discharge means and a circulation system, said circulation system comprising a reservoir for the liquid to be discharged, a flow duct connecting said reservoir and said common discharge means, a pump inserted in said flow duct, first valve means in said common discharge means to block the flow of liquid from said flow duct to said common discharge means, a return duct connecting the end of said flow duct adjacent said common discharge means and said reservoir, second valve means inserted in said return duct adjacent said reservoir, volumetric measuring means connected to said return duct between said common discharge means and said second valve means, third valve means inserted between said measuring means and the point of connection of said measuring means to said return duct, a compressed-air source connected to said measuring means and fourth valve means inserted between said air source and said measuring means.

2. An apparatus as claimed in claim 1, wherein said discharge means is common to a number of liquids to be discharged, and comprising a separate circulation system for each of said liquids to be discharged.

3. An apparatus as claimed in claim 1, comprising a timing device connected to said first and second valve means to open said first valve means and close said second valve means during the predetermined periods of discharge, and means connecting said timing device to said second and said third valve means to close said second valve means and open said third valve means for periods of the same duration as said periods of discharge.

References Cited by the Examiner

UNITED STATES PATENTS

| | | | |
|---|---|---|---|
| 2,062,173 | 11/36 | Haskins | 73—168 |
| 2,859,611 | 11/58 | Morse | 73—168 |
| 3,159,313 | 12/64 | Guilford | 222—145 X |

LOUIS J. DEMBO, *Primary Examiner.*

HADD S. LANE, *Examiner.*